United States Patent [19]

Thirion de Briel et al.

[11] Patent Number: 5,601,173

[45] Date of Patent: *Feb. 11, 1997

[54] LINER SUPPORT DISC FOR SUPPORTING FRICTION LINERS, ESPECIALLY FOR A MOTOR VEHICLE

[75] Inventors: Jacques Thirion de Briel, Colombes, France; Gino Villata, Buttigliera D'Asti, Italy; Michel Blard, Issy-Les-Moulineaux, France

[73] Assignee: Valeo, Paris, France

[ * ] Notice: The term of this patent shall not extend beyond the expiration date of Pat. No. 5,452,783.

[21] Appl. No.: 382,009

[22] PCT Filed: Jun. 21, 1994

[86] PCT No.: PCT/FR94/00752

§ 371 Date: May 22, 1995

§ 102(e) Date: May 22, 1995

[87] PCT Pub. No.: WO95/00769

PCT Pub. Date: Jan. 5, 1995

[30] Foreign Application Priority Data

Jun. 21, 1993 [FR] France .................... 93 07475
Jul. 15, 1993 [EP] European Pat. Off. ............. 93401832
Nov. 9, 1993 [FR] France .................... 93 13341

[51] Int. Cl.⁶ ........................................ F16D 13/64
[52] U.S. Cl. .................... 192/107 C; 192/107 R; 192/70.14; 188/73.2
[58] Field of Search ............. 192/107 C, 107 R, 192/70.14; 188/73.1, 73.2

[56] References Cited

U.S. PATENT DOCUMENTS

| | | | |
|---|---|---|---|
| 2,008,169 | 7/1935 | Blackmore et al. | 192/107 C |
| 2,027,650 | 1/1936 | Nutt | 192/107 C |
| 2,195,666 | 4/1940 | Wolfram . | |
| 2,618,369 | 11/1952 | Zeidler | 192/107 C |
| 2,902,130 | 9/1959 | Halberg et al. . | |
| 3,237,740 | 3/1966 | Wilson | 192/107 C |
| 4,108,699 | 8/1978 | de Gennes . | |
| 4,993,531 | 2/1991 | Villata | 192/107 C |
| 5,413,202 | 5/1995 | Maucher | 192/107 C |
| 5,452,783 | 9/1995 | Thirion de Briel et al. | 192/107 C |

FOREIGN PATENT DOCUMENTS

| | | | |
|---|---|---|---|
| 484847 | 7/1952 | Canada | 192/107 C |
| 579554 | 1/1994 | European Pat. Off. . | |
| 768143 | 7/1934 | France . | |
| 828837 | 5/1938 | France | 192/107 C |
| 786598 | 4/1940 | France . | |
| 2168833 | 3/1978 | France . | |
| 2751043 | 5/1978 | Germany | 192/107 C |
| 301962 | 10/1932 | Italy | 192/107 C |
| 459006 | 1/1937 | United Kingdom . | |
| 1465913 | 3/1977 | United Kingdom . | |

*Primary Examiner*—Andrea L. Pitts
*Attorney, Agent, or Firm*—Longacre & White

[57] ABSTRACT

A liner support disc for supporting friction liners, adapted to constitute a clutch friction wheel, especially for a motor vehicle, of the kind comprising a central portion and a peripheral portion divided into radial blades for receiving the friction liners, with each of the blades being joined integrally to the central portion through a foot, and comprising at least one support zone which is generally parallel to the mean plane of the central portion, for contact with at least one of the friction liners and for fastening of the latter. In a clutch friction wheel, the liners lie on either side of the peripheral portion.

11 Claims, 5 Drawing Sheets

LINER SUPPORT DISC FOR SUPPORTING FRICTION LINERS, ESPECIALLY FOR A MOTOR VEHICLE

BACKGROUND OF THE INVENTION a) Field of the Invention

The present invention relates to a liner support disc for supporting friction liners, adapted to constitute a clutch friction wheel, especially for a motor vehicle, of the kind comprising a central portion and a peripheral portion divided into radial blades for receiving the friction liners, with each of the said blades being joined integrally to the said central portion through a foot, and comprising at least one support zone which is generally parallel to the mean plane of the said central portion, for contact with at least one of the said friction liners and for fastening of the latter. In a clutch friction wheel, the said liners lie on either side of the peripheral portion.

b) Description of Related Art

Clutch friction wheels are sometimes subject in operation to disagreeable vibrations constituting what is often called judder. This judder is just as likely to occur at low torques, during a parking manoeuvre, as at high torques during a gear change when travelling, and during a hill start.

The support zones are sometimes not as large as desired, which gives rise to an embedding effect in which the friction liners become embedded in the hollows that exist between two support surfaces of the same blade.

This gives rise to a lack of flexibility, which is at least partly responsible for judder effects at maximum load.

In addition, there is a problem of contact with, in particular, the pressure plate of the clutch.

In this connection, in a clutch, each time the clutch is engaged, the friction liners become progressively gripped between a pressure plate and a reaction plate.

The heating which is caused by the friction leads inevitably to deformation of the pressure plate into a conical form, as is explained for example in the document U.S. Pat. No. 2,902,130, while the same is true, though to a lesser extent, for the reaction plate.

As a result, the zone in which the friction liners are subjected to the pressure from one or other of these plates becomes progressively offset towards the axis of the assembly, with consequent unequal wear of the said friction liners and a reduction in their efficiency (i.e. reduced torque transmission), and even the occurrence of judder effect.

In order to overcome these drawbacks and to resolve this problem, it has been proposed in the document EP-A-0 579 554 to provide blades of the tripod type which have a central support zone and two peripheral support zones on either side of the said central zone, which is offset axially with respect to the peripheral support zones and the central portion.

In one embodiment, the said blades are in circumferential alternation with a series of tongues.

In another embodiment, the said blades are arranged in circumferential alternation with a second series of blades of the tripod type, in the image of the first series.

The tripod blades serve for the fastening, in their central zone, of one of the friction liners, in this case the one which is associated with the pressure plate of the clutch, while the tongues serve for the fastening of the other friction liner, in this case the one that is associated with the reaction plate of the clutch.

By virtue of this arrangement, the tongues, or the tripod blades of the second series, have sufficient elasticity to follow the tendency of the reaction plate to adopt a conical form, while the tripod blades follow the tendency of the pressure plate to adopt a conical form, and have large contact surfaces.

In addition, embedding and judder effects are reduced, and the blades are able to rotate at higher speeds, which eliminates bending forces in the blade feet caused by centrifugal force.

In the said document, fastening of the friction liners is achieved by means of a row of rivets arranged on a common pitch circle. As a result, the central zone of the first series of tripod blades is provided with an aperture for passage through it of a rivet which constitutes a fastening member.

The same is true of the tongues or of the central zone of the second series of tripod blades.

For clutch friction wheels of large size (large diameter), or when the friction liners are thin, being adhesively secured on foils which are carried by riveting on the liner support disc, it is then necessary to provide at least two rows of rivets arranged on pitch circles of different diameters.

A problem of locating the holes for accommodating the fastening members then arises in connection with the central zone of the tripod blades, because it is necessary to space the holes which accommodate the rivets by a substantial radial distance apart for proper fastening of the friction liners, and therefore to increase the radial depth of the central zone.

Similarly, when it is desired to secure the liners adhesively on the central zones, it is desirable to increase the radial size of the central zones in order to support the friction liner internally and improve the strength of adhesion.

SUMMARY OF THE INVENTION

An object of the present invention is to respond to these requirements, and accordingly to provide, in a simple and inexpensive way, novel tripod blades which enable the radial size of the central zones to be increased.

With the central zone of a tripod blade being joined to the central portion of the liner support disc, by means of a foot which includes at least one inclined zone in the form of a longitudinal bent portion at right angles to the radial axis of symmetry of the tripod blade, according to the invention the central zone of at least some of the tripod blades is extended radially inwardly by virtue of a slot formed across the said longitudinal bent portion.

Due to the invention, in all cases the engagement surface for the liner concerned, and therefore the resistance of the liner support disc to centrifugal force, are increased. It is possible to arrange in the same plane at least two fastening holes spaced apart radially from each other, in the central zone of one tripod blade.

In this connection, it is enough to provide the extension in accordance with the invention with an additional hole for passage through it of a fastening member for the friction liner. This flexible extension also reduces the chance of rupture.

Thus it is possible to secure the friction liner concerned (which may be of divided form) to the central zones of the first series of tripod blades, by means of at least two sets of rivets or other fastening members, spaced apart radially from each other.

The friction liner is thus well secured. This liner may then rotate at high speeds of rotation.

Similarly, it is possible to secure the friction liner directly by adhesive bonding on the central zones.

In this connection, because of the extension, the said liner is secured locally over an increased depth, which is favourable to good adhesion. In addition, the damage of peeling or separation is reduced because of the flexible extension.

It is of course possible to retain the hole of the prior art, and to secure the liner adhesively or by riveting.

Nevertheless, it will be appreciated that the arrangement having only adhesive bonding is advantageous because it enables the thickness of the friction liners to be reduced to a useful value. In this connection, there is no need to provide any extra thickness as in a riveted arrangement. The inertia of the clutch friction wheel is thus reduced. The mechanical strength of the central zones is increased due to the fact that there is no need to provide a rivet hole. The friction wheel is therefore able to rotate at even higher speeds of rotation.

It will be appreciated that the arrangement in accordance with the invention is inexpensive, because it does not render necessary any substantial modification of the manufacturing tooling for the liner support disc.

In this connection, it is enough to form the slot by press forming with a simple tool and to provide, or not, two rows of fastening holes. In addition, the extension in accordance with the invention increases the support zone of the liner concerned without any detriment to the mechanical strength of the longitudinal bent portion.

In accordance with another feature, in order to preserve the maximum amount of support for the friction liner concerned, with distances between engagement surfaces being as small as possible, the number of blades is multiplied.

As a result, these blades have a reduced circumferential width, and it is then possible to configure the above mentioned tongues, which are generally in the plane of the central portion, as tripod blades with a central zone in the plane of the central portion, together with two peripheral support zones on either side of the said central zone.

Thus, during the elastic compression of the friction liners, the friction liner which is associated with the tongues undergoes a reaction due to new peripheral support zones, which are adapted to make engagement against the other friction liner.

Embedding effects are thus reduced, with wear in the friction liner associated with the tongues being better distributed. In addition, wear effects in the friction liner associated with the first set of blades is reduced because the peripheral support zones of the tongues provide an additional engagement surface. For the other friction liner, wear is made more even.

It is of course possible to replace the above mentioned tongues with a second set of tripod blades.

In a modification, at least some of the said tongues have, in a bent junction portion, at least one additional support zone which is offset axially towards the central zones of the first set of tripod blades.

The supplementary zones may be situated at the free end of the tongue or within the latter, being defined by a slot. Any combination is possible.

As before, embedding effects are reduced, while wear in the friction liner associated with the tongues is more evenly distributed because of the additional support zone.

According to one feature, the slot is formed locally in the central zone of the tripod blade, in order to reduce the risk of rupture in the region of the extension.

BRIEF DESCRIPTION OF THE DRAWINGS

The following description illustrates the invention with reference to the attached drawings, in which.

DETAILED DESCRIPTION OF PREFERRED EMBODIMENTS

Figure 1:
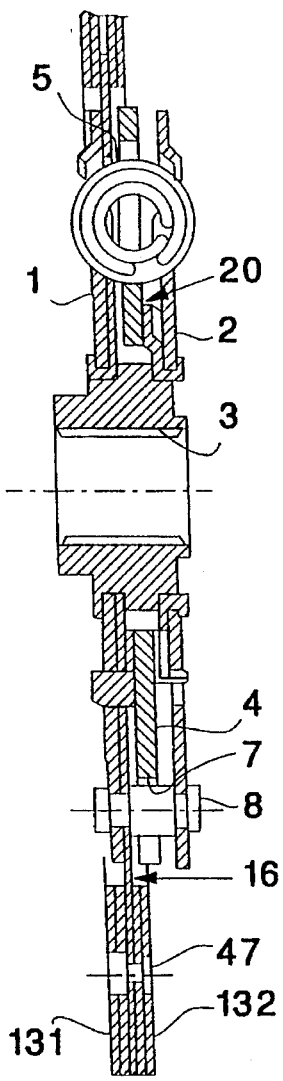
FIG. 1 is a view in axial cross section of a clutch friction wheel equipped with a liner support disc in accordance with the invention.

The drawings show a liner support disc which is adapted to form part of a clutch friction wheel for a motor vehicle.

This friction wheel (FIGS. 1 and 2) comprises a central portion 16 and a peripheral portion which is divided into radial blades 771 which are arranged alternately in the circumferential direction, being in this example at regular intervals, with a series of radial tongues 772 in the plane of the central portion 16 of the liner support disc. In these Figures, the blades 771 and tongues 772 are integral with the central portion 16.

As is described in the Application EP-A-0 579 554, each blade is joined to the central portion 16 through a longitudinal foot 724, and has a central support zone 722 and two peripheral support zones 723 at its outer periphery.

The wide central zone 722 is offset axially with respect to the central portion and with respect to the peripheral support zones 723.

The central zone 722, which is large, serves for the fastening of a friction liner 132, while the tongues 772 serve for the fastening of a further friction liner 131. To this end, the tongues 772 and the central zones 722 of the blades 771 are formed in this example with holes 19, for the fastening of the said liners 131, 132 to the liner support disc, in this example by means of rivets 47 (FIG. 1).

In accordance with one feature of the invention, the holes 19 are distributed over two pitch circles of different diameters. In a modification, some of the holes 19 do not lie on the said pitch circle, so that they define a zig-zag. In a modification, adhesive fastening may be used, which enables the fastening holes to be omitted, and the strength of the blades to be improved, in a manner described below.

The liner support disc is equipped with two annular friction liners 131, 132 which are mounted in back-to-back relationship on either side of the central portion 16.

These friction liners are in this example of the organic type, being circumferentially continuous and reinforced by glass fibres of KEVLAR, or otherwise.

In a clutch, the liners 131, 132 are normally gripped between the pressure and reaction plates (not shown) of the clutch, which are fixed to the crankshaft of the internal combustion engine of the motor vehicle for rotation with it, while the hub 3 is coupled, through its splined internal bore, to the input shaft of the gearbox for rotation with the latter.

During operation of the clutch to disengage the latter, the friction liners 131, 132 are released so that in the disengaged position of the clutch, the liners are not in contact with the said pressure and reaction plates.

When the clutch is re-engaged, the liners 131, 132 are gripped progressively and elastically between the said plates.

This progressive gripping action is due in the present case mainly to the tripod blades 771, and more particularly, it is due to their peripheral support zones 723 and the foot 724.

The said blades 771 are of tripod form, with three flat support or engagement zones, 723 and 722 respectively.

The flat central zone 722 is in contact with the friction liner 132 which is associated with the pressure plate, and serves for the fastening of the said liner 132. This zone 722 reduces in width towards the outer periphery of the liner support disc. It is thus wider at its inner periphery.

More precisely, the liner support disc with its liners 131, 132 is in this example part of a clutch friction wheel which comprises two coaxial parts mounted for movement of one with respect to the other against the action of circumferentially acting resilient means 5 and axially acting friction means 20.

Such a friction wheel is described, for example, in the Application EP-A-0 579 554, and in U.S. Pat. No. 5,014, 842, to which reference can be made.

Figure 3:
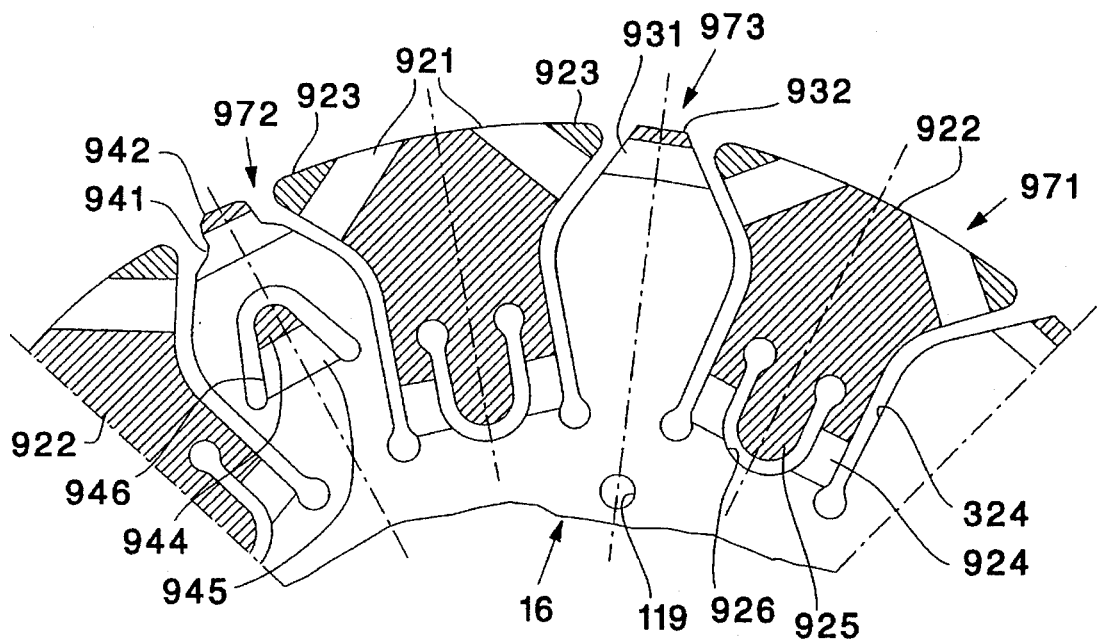
FIGS. 3 to 10 are views similar to FIG. 2 for further embodiments.

In the present example, one of the parts comprises two guide rings 1, 2 together with the liner support disc, while the other coaxial part comprises a damper plate 4 which is secured by seaming (not shown) to a hub 3 for rotation with the latter, or, in the present case, by means of loose coupling means which can be seen in particular in FIG. 3 of U.S. Pat. No. 5,014,842.

Accordingly, these means comprise trapezoidal teeth which are formed on the outer periphery of the hub 3 and on the inner periphery of the damper plate 4, with the said teeth meshing together and having a clearance between them.

Low stiffness springs, not shown, engage at each of their ends on cup members which are fitted in slots of the hub 3 and damper plate 4, so as to give elastic coupling between the said components.

It is possible to reverse the structures, with the liner support disc then being secured to the damper plate 4 which is movable in rotation with respect to the hub 3, while the guide rings are then fixed to the hub 3.

Similarly, the liner support disc may be fixed to the damper plate 4, which is itself secured to the hub 3, the clutch friction wheel then being of the rigid type as can be seen in the document EP-A-0 579 554.

In this example, the liner support disc is abutted in its central portion 16 to the guide ring 1, and is secured to the latter by means of spacers which extend, with a clearance, through apertures 7 formed in the damper plate 4.

These spacers 8 secure together the guide rings 1, 2 which are arranged on either side of the damper plate 4.

The resilient means 5 consist in this example of coil springs which are here mounted in pairs, in windows formed in facing relationship with each other in the guide rings 1, 2 and in the damper plate 4 in a manner known per se.

The friction means 20 comprise a friction ring which is interposed axially between the damper plate 4 and the ring 1, together with a thrust ring which is mounted on the guide ring 2, for rotation with the latter, by means of axial lugs which are engaged in apertures formed in the said ring 2.

A spring bears on the ring 2, and biasses the thrust ring into contact with the damper plate 4.

The zones 723 lie at the outer periphery of the blades 771, on either side of the central zone 722. They are generally triangular in shape and are joined to the zone 722 through bent portions 721, which are oblique with respect to the radial axis of symmetry of the blade 771. These bent portions 721 are axially inclined, and lie symmetrically with respect to the said radial axis.

The zones 723 and 722 are thus offset axially because of the axially offset bent portions 721, while being parallel to each other. More precisely, the zones 723 are arranged to make contact with the friction liner 131 associated with the reaction plate of the clutch. In the present example they extend in the plane of the central portion 16.

The central zone 722 is joined to the central portion 16 through a tangentially orientated bent portion 724, or longitudinal bent portion, which in this example is at right angles to the radial axis of symmetry of the blade. This axially oblique bent portion 724 constitutes the foot of the blade, and gives an axial offset of the zone 722 with respect to the central portion 16. The bent portion 724 extends, here, symmetrically with respect to the said radial axis.

Thus, when the liners 131, 132 are compressed, the zones 723 deform axially. It will be noted that the bent portions 724 are of large width and therefore very robust. Vertical slots 224 separate the blades 771 from the tongues 772. These slots are open at the outer periphery of the liner support disc, and have a circular closed inner end for their junction with the bent portions 724 and central portion 16.

The cranked blades 771 are of reduced circumferential extent as compared with that in the document EP-A-0 579 554, so that the tongues 772 have a circumferential width which is close to that of the blades 771 in accordance with one feature of the invention. The engagement surfaces for each liner are thus as close as possible to each other.

This is done with a view to preserving the maximum engagement surface area for the friction liners 131, 132, with the smallest possible distances between engagement surfaces.

The number of blades is thus multiplied. In this example, the clutch friction wheel being of large size, the arrangement involves, for example, fitting at least two rows of fastening members 47, such as the above mentioned rivets, or screws or bolts, in order to secure the friction liners 131, 132 and therefore to provide at least some blades 771 with at least two fastening holes 19 for passage through them of the said fastening members.

In a modification, it is possible to provide a single row of rivets together with adhesive fastening, or adhesive fastening by itself. In every case the clutch friction wheel must have improved resistance to the effects of centrifugal force.

Figure 2:
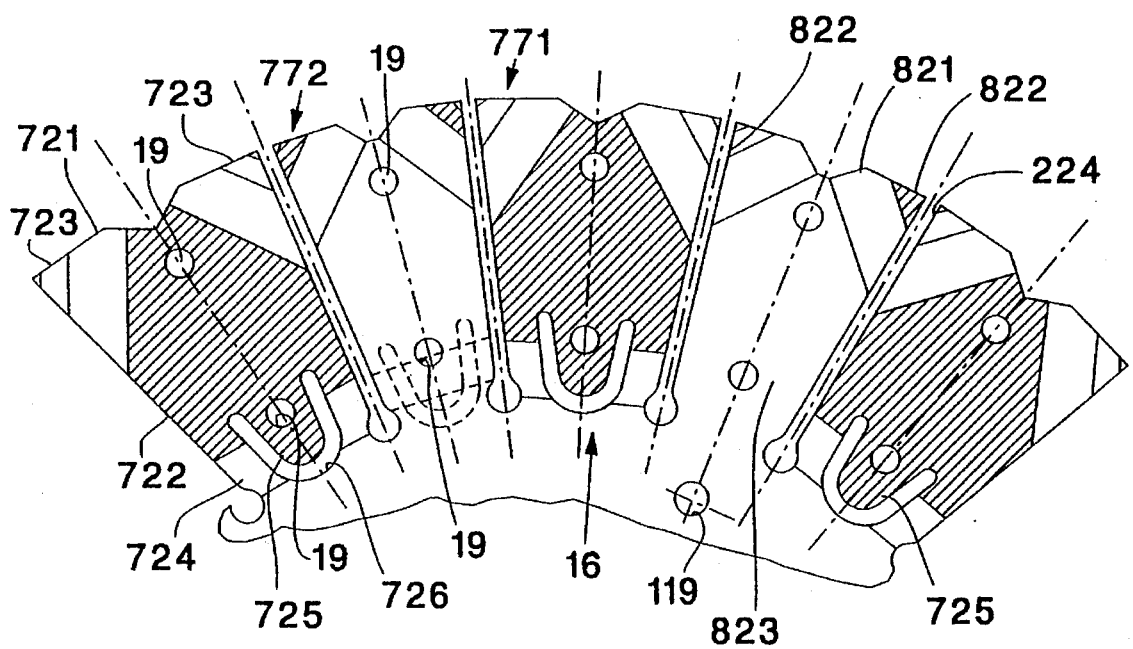
FIG. 2 is a partial view in elevation of the said liner support disc, with the support zones shown cross hatched.

Thus, in accordance with the invention, a liner support disc of the type described above is characterised in that the central zone 722 of at least some of the tripod blades 771 is extended centrally (at 725) radially inwardly by virtue of a slot 726 formed in the longitudinal bent portion 724. In FIGS. 1 and 2, the said extension 725 is provided with an additional hole 19 for passage through it of a fastening member 47, which in this example is a rivet 47. The engagement surface for the liner 132 is thus increased, and the fastening of the liner 132 is stronger.

As can be seen in FIG. 2, a further fastening hole 19 is arranged at the outer periphery of the central zone 722 and blade 771.

Thus the holes 19 for fastening of the liner 132, lying in the same plane, are separated from each other radially by a substantial distance, and in this example they are arranged radially on the axis of symmetry of the blade 771.

According to one feature, the tongues 772 are in the image of the blades 771, and accordingly, in this example, they have a central zone 823 in the plane of the central portion 16, together with two peripheral support zones 822 on either side of the said central zone 823.

A bent portion 821, which is oblique in the axial direction and inclined in the radial direction, joins each zone 822 to the peripheral portion of the central zone 823. The zones 822 are offset axially towards the central zones 722 of the blades 771. They may be in the same plane as the latter, or slightly behind it in the axial direction.

Two fastening holes 19 in a common plane are provided in the central zone 823. These holes 19 are radially aligned on the radial axis of symmetry of the tongue 772, being located on the same pitch circles as the holes 19 of the blades 771.

In some of the tongues 772, these holes are aligned with a fastening hole 119 for securing the central portion 16, by riveting in FIG. 1, to the damper plate 4, which is itself secured by riveting on a flange of the hub 3.

In a modification, indicated in broken lines in FIG. 2, the tongues 772 could of course be replaced by a second set of cranked tripod blades, of similar form to the blades 771, with a longitudinal bent portion joining the central zone to the central portion 16 of the liner support disc.

In this example, the slot 726 in accordance with the invention is V-shaped with a rounded base, with the point of the V being directed towards the axis of the friction wheel (i.e. towards the axis of the central portion 16). The extension 725 thus has the form of a rounded V. It constitutes an additional engagement lug oriented generally radially inwardly, as in the other Figures described below.

This slot is formed in the bent portion 724, and locally in a small part of the central zone 722 and the central portion 16. The bent portion 724 is thus divided into two, which improves the above mentioned progressive gripping effect. The bent portion 724 has good mechanical strength in spite of the slot provided in accordance with the invention.

It will be noted that the extension 725 has a divergent root zone by which it is joined to the central zone 722.

Risks of rupture are reduced because of this root zone.

The radial axis of symmetry of the slot 726 is coincident with the radial axis of symmetry of the blade 771.

It will be appreciated that the good equilibrium of the clutch friction wheel, and good flatness of its friction liners, are due in particular to the regular spacing of the fastening holes 19 and to their position on the axis of symmetry of the tongues 772 and blades 771.

The simplicity of manufacture of this arrangement will also be noted, this being due to the radial displacement of the press tool that can be obtained, enabling discs to be made with blades and tongues of different depths.

In this example, in the position in which the clutch is engaged (with the liners 131, 132 gripped), a space exists between the two liners 131, 132 so that the blades 771 are not totally squeezed, and so that the said liners are permitted to adapt to the form of the pressure and reaction plates.

The tripod blades may of course have another shape, such as that described in the above mentioned document EP-A-0 579 554.

Thus in FIG. 3, the tripod blade 971 has a central support zone 922 which is of reduced width at its outer periphery, and which is offset axially with respect to the central portion 16, by virtue of the bent portions 921, oblique with respect to the radial axis of symmetry of the blade, and the longitudinal bent portion 924 at right angles to the said axis of symmetry.

The central zone 922, as in FIG. 2, is extended radially inwardly in the middle, by a U-shaped central slot 926 which is formed in the longitudinal bent portion 924. This extension is generally in the form of a tongue or lugs 925, having a root zone that joins it to the central zone 922 of reduced width, with the vertical ends of the slot 926 being open into circular holes formed in the zone 922 having the slot 926.

The lug 925 is thus directed towards the axis of the assembly, and has a rounded free end.

The peripheral support zones 923 are generally in the plane of the portion 16. These zones 923 project circumferentially with respect to the central zone 922, in such a way that the blades 971 are generally T-shaped.

Advantage is taken of this shape to increase the circumferential width of the tongues 972, 973 in their middle radial zone. Thus, these tongues 972, 973 are, in their radially central part, wider than at their free ends and wider than in the zone by which they are joined to the portion 16.

In this example, the radial tongues 972 and 973 are of different configurations. These tongues are arranged in regular alternation in the circumferential direction with the blades 971. The free end of the tongue 972 is of reduced circumferential width, and has a supplementary support zone 942 joined to the main portion of the tongue through a connecting bent portion 941, which for good flexibility has a constant width at the level of the zone 942, offset axially towards the central zone of the support surface 922 of the blades 971. This bent portion 941 is widened at its base. In this example, the supplementary zone 942 is in the plane of the zone 922 of the blade 971. The said zone 942 can of course be situated slightly further back with respect to the zone 922.

The tongue 973 has at its free end a zone 932, which is joined through a bent portion 931 to the main zone of the tongue 973.

The bent portion 931 and the zone 932, which are here in the plane of the central zone 922, are trapezoidal in shape.

As will have been understood, because of the two sets of tongues, it is possible to provide an axial offset between the zones 942 and the zone 932, in such a way that the liners are well supported during engagement of the clutch.

In this example, the central portion 16 has fastening holes 119 for the fastening of the central portion 16 to the guide ring 1, or to the damper plate 4 as the case may be.

It will be noted that the slot 926 is formed centrally in the bent portion 924, which is thus divided into two, and this improves the progressive gripping of the blade 971. This bent portion has good mechanical strength in spite of the slot.

It will be noted that the slots 324 that separate the radial tongues 972, 973 from the blades 971 have a non-straight shape due to the central widening of the said tongues.

In this example, the liners 131 and 132 are secured directly by adhesion on the main part of the tongues 972, 973 and on the central zones 922 of the blades 971. It will be noted that the flexible extension 925 is favourable to adhesive bonding.

By virtue of all these arrangements, it is possible to reduce the thickness of the liners 131, 132.

Thus, the said liners 131, 132 have just the required thickness, because there is no need to provide any thickened portion for the rivets 47 as in the embodiment of FIGS. 1 and 2.

Thus the inertia of the clutch friction wheel is reduced, which is beneficial to conservation, during disengagement of the clutch, of the gears of the gearbox on the input shaft of which the hub 3 is mounted.

In addition, the blades and the tongues are stiffened because they do not have holes for accommodating rivets.

Accordingly, it is possible to benefit from this so as to create, for example in the tongue 972, a supplementary support zone 944 which is offset axially towards the zone 922 by virtue of a bent portion 945 which joins the said zone 944 to the main part of the tongue 972 in the plane of the portion 16.

The provision of this supplementary zone is obtained by virtue of a slot 946, which is generally V-shaped and which is directed radially inwardly by contrast with the slot 926.

Thus, a tongue or lug 944, 945 is formed which is directed radially outwardly, extending symmetrically with respect to the radial axis of symmetry of the tongue 972.

The provision of the supplementary support zone 925 does of course also enable a supplementary hole to be provided for the fastening of the liner 132 by riveting, as in FIG. 2.

Figure 4:
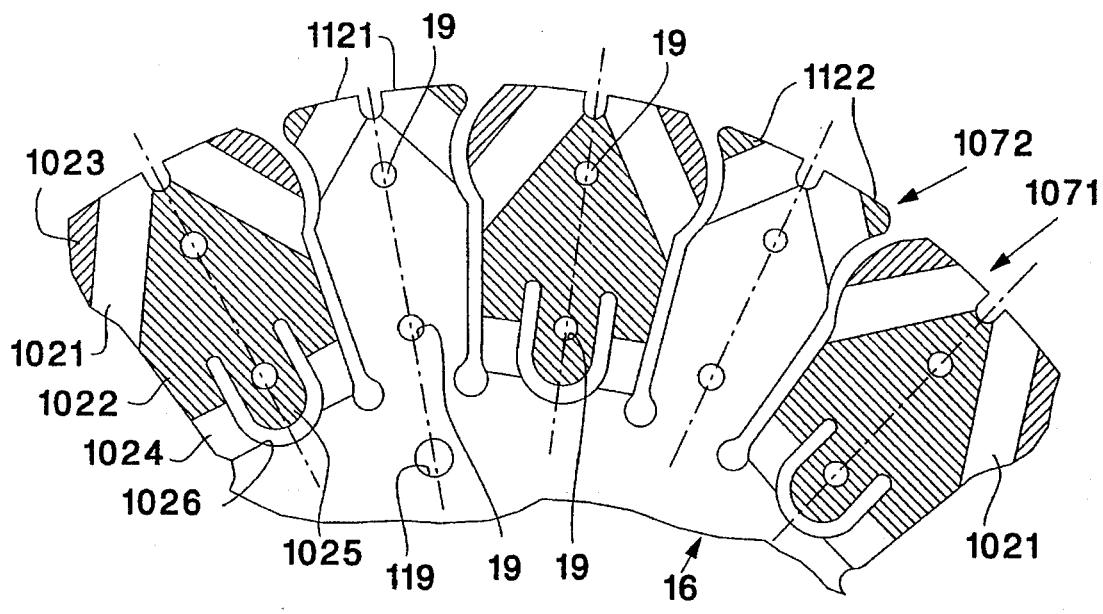

Thus, in FIG. 4, each tongue 1072 and each tripod blade 1071 has two holes 19, through which pass the fastening members for the liners 131, 132.

These holes are radially aligned on the radial axis of symmetry of the radial tongues 1072 and blades 1071.

One of the holes 19 is located in the zone of the extension 1025 of the central zone delimited by a U-shaped slot 1026, which is formed centrally in the longitudinal bent portion 1024 of the blade 1071. The extension 1025, in the form of a tongue or lug, is in the plane of the central support zone 1022 of the blade 1071, with the zone 1022 being offset axially with respect to the central zone 16, by virtue of the bent portion 1024 and the bent portions 1021 which are oblique with respect to the radial axis of symmetry of the blade 1071.

The bent portions 1021 are joined to the peripheral support zones 1023 which are generally parallel to the bent portions 1021.

The zones 1023 are generally in the plane of the zone 16.

The shape of the tongues 1072 is generally similar to that of the blades 1071, the only difference being that their main part is in the same plane as the central zone 16.

The radial tongues 1072 thus have at their outer periphery two supplementary peripheral support zones 1122, which lie generally in the same plane as the central zone 1022 of the blades 1071.

These zones 1122 are joined to the main zone of the said tongue through bent portions 1121, which are oblique with respect to the radial axis of symmetry of the tongue 1072.

In this embodiment, the blades 1071 are widened at their outer periphery, and the tongues 1072 are widened circumferentially at their outer periphery.

The tongues and the tripod blades can of course be separate from each other, being attached, for example by holes 229, to the guide ring 1 or damper plate 4.

Figures 5, 6:
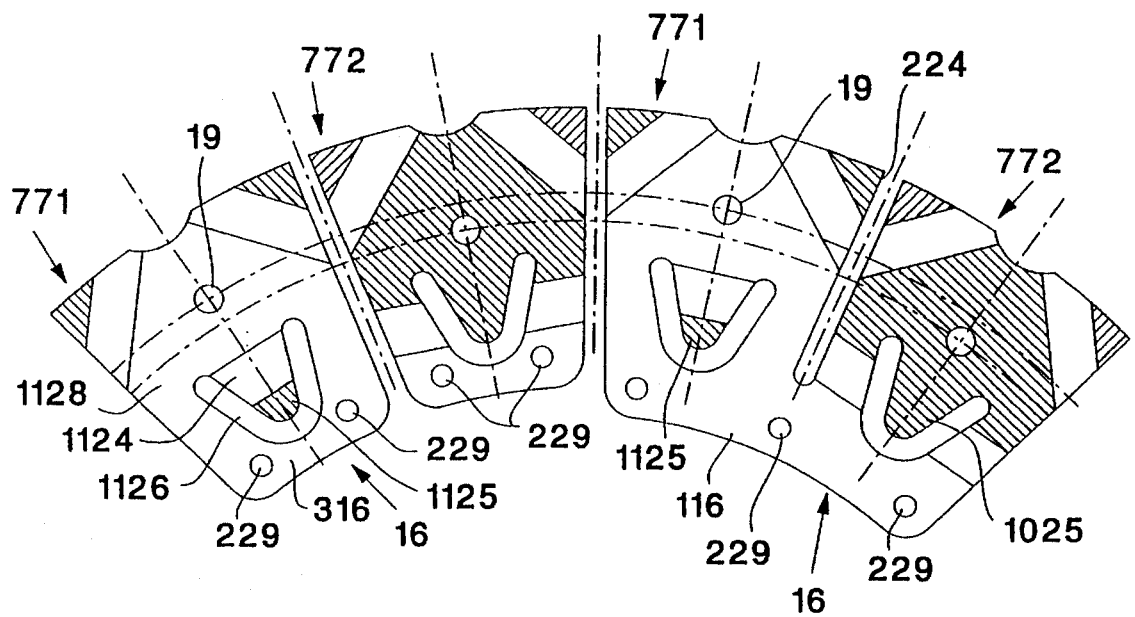

Thus in FIG. 5, the tripod blades 772 are in circumferential alternation with the radial tongues 771, having a shape similar to that of the blades 772 as shown in FIG. 2.

In this way, the inner periphery 316 of the tongue 771 has two holes 229 through which fastening members such as rivets pass for securing to the guide ring 1 for example.

In this embodiment, the tongue 771 has a supplementary support zone 1125 in its central part.

This zone 1125 is in the same plane as the central zone of the blade 772, and is joined through a bent portion 1124 to the main portion 1128 of the tongue 771.

All of this is obtained by virtue of the slot 1126 which is generally V-shaped.

The bent portion 1124 with the tapered support zone 1125 generally constitutes a tongue or lug which is directed towards the axis of the assembly, by contrast with the embodiment of FIG. 3.

The tongue 772 is extended radially beyond its longitudinal bent portion, towards the axis of the assembly, so that it can be fastened to the guide ring, with the aid of holes 229 through which fastening members pass.

With reference to FIG. 6, the tongue 771 and blade 772 can of course be joined together at their base.

In that case, each blade 771 is integral with an integral strip 116, which is generally in the form of an angular sector.

The strip 116 joins one blade 771 to one tongue 772, and has three fastening holes 229 for securing it to the guide ring 1 or damper plate 4, in this case by riveting.

In FIGS. 5 and 6, the blades 772 and the tongues 771 are mirror images of each other, since their central zone has a generally V-shaped lug 1025, 1124, 1125 directed towards the axis of the assembly.

The lug 1025 is formed in the longitudinal bent portion of the tongue 772 as explained above. The liners 131, 132 can be secured by adhesive bonding and riveting (with the aid of the holes 19), since the lug 1025 permits such adhesive bonding.

It is of course possible (FIG. 7) to divide the central portion into strips 226 with ears at each of their circumferential ends. The ears are provided with holes 229, and overlap as between a tongue and a consecutive blade 772.

The strips 226 are secured in this embodiment to the guide ring 1, by riveting through the holes 229.

Figure 7:
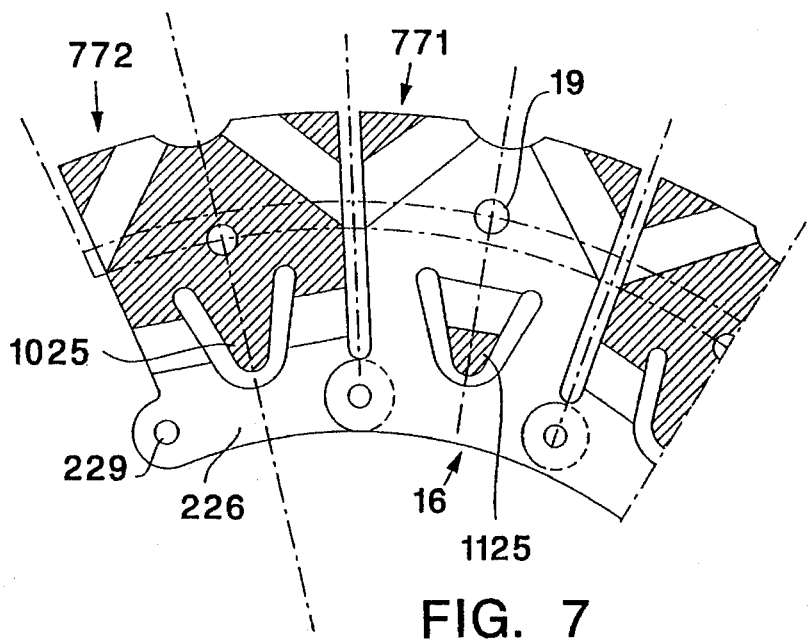
Figure 8:
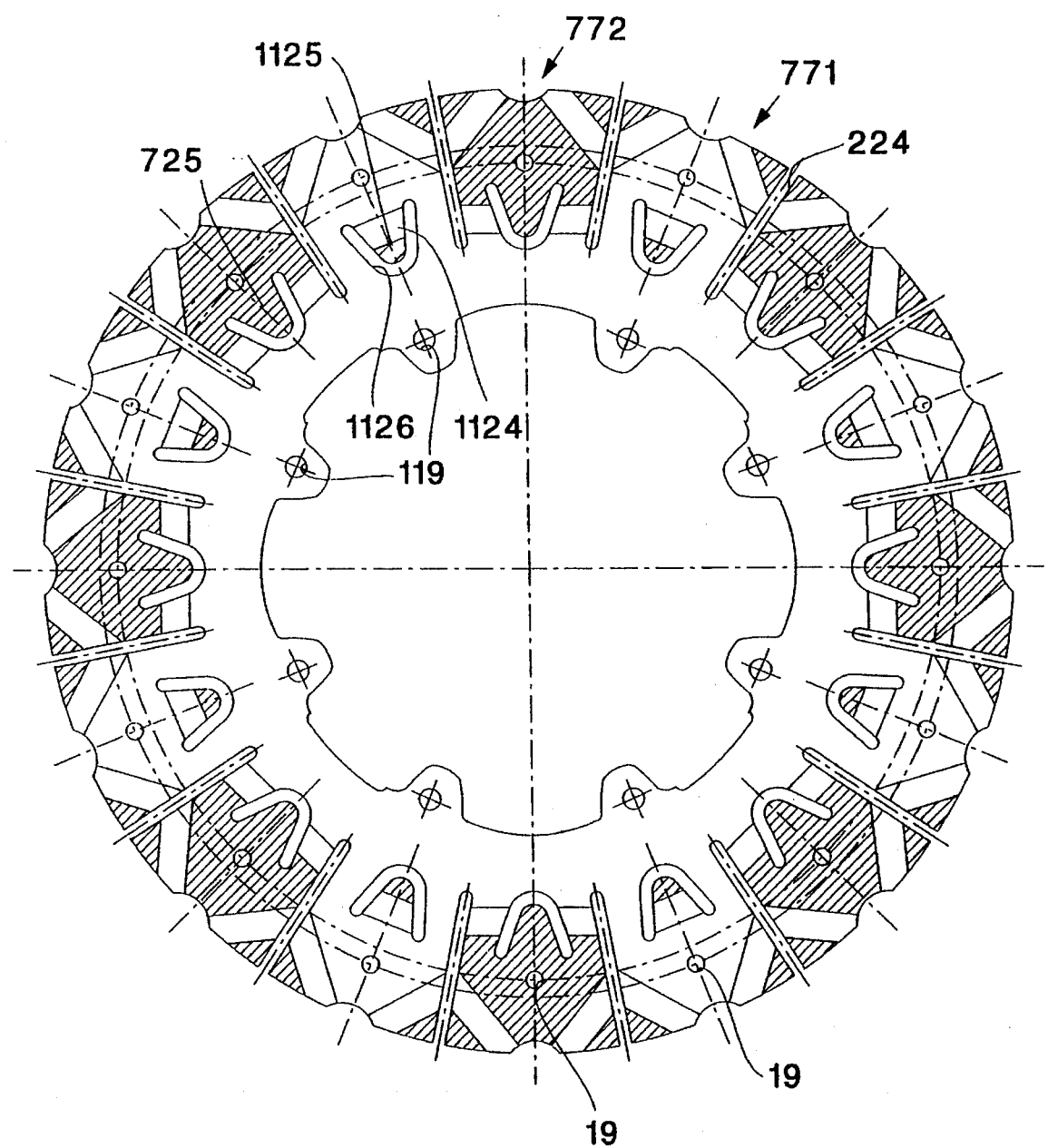

The blades 771 and the tongues 772 may of course (FIG. 8) be integral as in FIG. 2, with the holes 19 for the blades 772 being arranged as in FIGS. 5 to 7 on a pitch circle of a different (smaller) diameter from that on which the holes 19 associated with the tongues 771 are arranged, the holes 119 being formed in tongues.

As in FIGS. 5 to 7, it is of course possible to secured the liners by adhesive bonding and by riveting, with the adhesive bonding replacing the second set of rivets. The tongues 771 may consist of tripod blades with a lug 1025.

Figure 9:
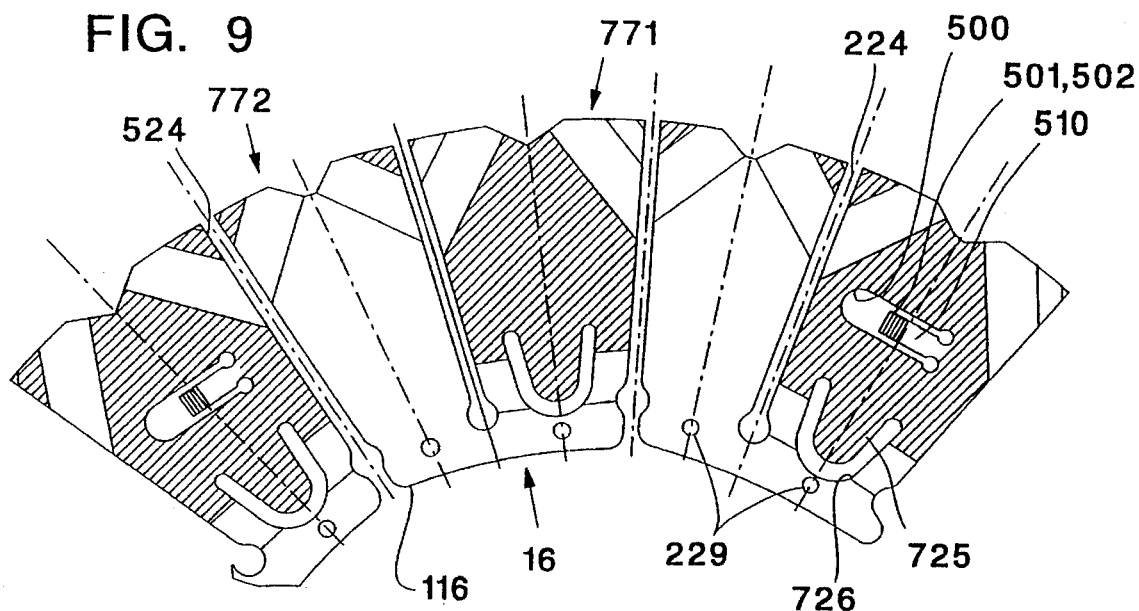

In FIG. 9, the liner support disc includes two attached support discs, each of which comprises blades of the tripod type. These blades have a form similar to that ill FIG. 6, and accordingly each of them is secured on the appropriate support disc by means of the holes 229.

These support discs are attached, and are secured to each other by means of the spacers 8 in FIG. 1, at the same time as the guide ring 1.

The tripod blades 771 are thus arranged alternately with tongues 772, being separated by slots 524, 224. The tripod blades are mounted back to back, with the friction liner 131, 132 being secured adhesively to the central zones of the tripod blades 771.

Thus, one of the friction liners is secured adhesively on the central support zones of one of the sets of tripod blades, while the other liner is secured adhesively on the central zones of the other set of tripod blades.

Coupling means 501, 502, having a uni-directional axial action and being adapted to limit the axial spacing between the two support discs, are arranged between these latter.

The said spacing means are fitted at the level of some of the central support zones of the tripod blades 771.

Thus, in this example, there is a regular alternate arrangement of tripod blades 771, similar to those in FIG. 2, and tripod blades having coupling means. These coupling means comprise hooks 501, 502. The hooks comprise a lug 501, 502 which extends longitudinally parallel to the central support zone of the appropriate support disc.

The lug 501, 502 is joined to the central support zone through a bent portion 510. The lugs are defined in a pressed-out portion 500 in the form of an oblong hole formed in the central support zone.

Thus the hook carried by one of the discs is arranged to come into abutment with an associated abutment surface which is carried by the other disc. This other disc carries a lug 502 in the image of the lug 501.

In this way, a hook 501, 502, 510 is provided, which extends mainly on one side of the radial axis of symmetry of the tripod blade, and only the lug 501, 502 lies on either side of the said axis in order to cooperate with the associated lug of the other disc.

Thus, the lug 501, 502 extends parallel to the central support zone, being offset axially towards the friction liner opposite to that which is secured on the central zone of the appropriate tripod blade.

As will be understood, one of the discs includes at least one lug 501, 502 extending from one edge of the central support zone towards the other edge of the said central support zone, and vice versa for the other disc.

It is thus possible to provide a bayonet fitting. For example, the lug 501 of one of the discs is introduced into the aperture 500 of the other disc, and is then rotated circumferentially so as to make engagement with the associated lug 502 of the other disc.

The aperture 500 is of course dimensioned accordingly.

A sub-assembly is thus easily made up, comprising the two discs with their blades 771 and tongues 772 and the liners 131, 132, with the axial spacing being limited by cooperation of the lugs 501, 502.

This sub-assembly is then fitted on the guide rings 1, 2 by means of the spacers 8.

The lugs 501, 502 are in engagement with each other when the clutch is disengaged, and the axial spacing between the tripod blades is thus limited.

The lugs 501, 502 are generally, when the clutch is disengaged, in the same plane as the peripheral support zones of the tripod blades, which are themselves generally in the same plane as the discs.

It will be appreciated that the friction liners 131, 132 are adhesively secured over a large surface area.

It is of course possible (FIGS. 10 and 11) to provide supplementary support zones 1425 in the blades 1471, in the peripheral support zones of the said blade.

The support zones 1425 extend in the same plane as the central zone 1422. More precisely, the central zone 1422 is joined through an oblique bent portion 1421 to a peripheral support zone 1423 in the same plane as the main portion of the tongue 1472.

This zone 1423 is joined through a bent portion 1424, which is oblique with respect to the radial axis of symmetry of the blade 1471, to the supplementary support zone 1425. The said zone 1425 is in the same plane as the supplementary zone 622 of the tongue 1472. The zone 622 is defined at the free end of the tongue 1472, and is generally rectangular in shape. It is joined to the main portion of the tongue 1472 through a bent portion 621, which is similar to the bent portions 941 and 931 in FIG. 3.

This tongue 1472 also has, as in FIGS. 5 to 8, a supplementary support zone 1125 which is joined through a bent portion 1124 to the main portion of the tongue 671.

All of this is defined by a generally V-shaped slot 1426. Thus the zone 1125 is in the same plane as the central zone 1422.

By virtue of all of these supplementary zones, which define zones of stabilisation, good stability is obtained for the friction liners, and this is favourable to a reduction in wear. The said liners are well supported.

It is of course possible to secure the friction liners 131, 132 adhesively to the tongues and blades 771, 772.

The present invention is of course not limited to the embodiment described.

The friction liners 131, 132 may be of divided form. In a modification, each liner may include a continuous support crown in which openings are formed for securing friction pads in the manner described in the above mentioned document EP-A-0 579 554.

The feet of the blades may be constituted not only by the tangential bent portions, so that an end portion of the feet joins the bent portions to the central portion of the friction wheel.

According to the particular application, it is of course possible to omit the support zones formed at the outer periphery of the radial tongues. For example in FIG. 5, it is possible to omit the bent portion 941 and the zone 942, and to retain the zone 944 and the slot 946.

It is also possible to provide two pressed-out openings directed in opposite radial directions and bounding a connecting bent portion that carries a supplementary support zone.

All combinations are possible.

It will be appreciated that in FIGS. 5 to 8, the three supplementary support zones, namely the portion 1125 and the two peripheral support zones of the tongue 771, are carefully spaced apart in a triangular manner which is highly favourable to the stability and reduction in wear of the liners 131, 132.

The oblique bent portions that join the peripheral support zones to the central zone may of course be arranged asymmetrically with respect to the radial axis of symmetry of the blade. The same is true for the central zone.

The supplementary support zones are not necessarily arranged on the radial axis of symmetry of the tongue. A slight offset can exist.

In general terms, it will be noted that in FIGS. 3 to 8 and 10 to 11, the tongues offer at least one additional support zone.

Thus, during compression of the liners 131, 132, the respective zone or zones 932-822-1122 are adapted to make contact with the liner 132 so as thus to offer a reaction surface. The said zones accordingly constitute stabilising zones which, in this example, extend in the plane of the central zone 722 by virtue of the above mentioned bent portions 931-821-1131.

In a modification, these zones may be slightly retracted with respect to the central zones. Thus the liner 131 remains very flat.

In this way, a liner support disc is obtained which has large support zones at its outer periphery, reducing embedding and judder effects because the friction liners 131, 132 remain in a substantially parallel plane. The liner support disc, and therefore the friction wheel, can thus rotate at high speeds while following the tendency of the pressure and reaction plates to adopt a conical configuration. The distribution of wear in the liners is improved even more.

It will be appreciated that the bent portions 724-924-1024-931-921-821-1121-1021 give good stability to the liner support disc, which enables good contact to be obtained between the friction liners and the pressure and reaction plates, which reduces wear in the friction liners.

It will be appreciated that good balancing of the friction wheel, and good flatness of its friction liners, are due in particular to the regular distribution of the fastening holes 19, and to their position on the axis of symmetry of the tongues and tripod blades.

In this example, in the clutch engaged position (with the liners 131, 132 in a gripped condition), a space exists between the two liners 131, 132 such that the blades are not totally compressed, so as to enable the said liners to adapt to the shape of the pressure and reaction plates.

Figure 10:
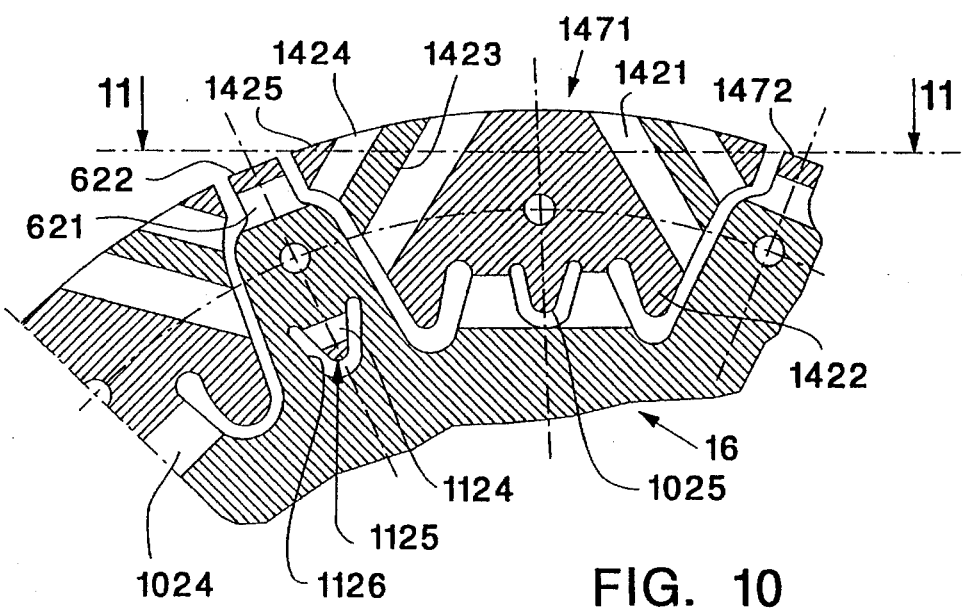
Figure 11:
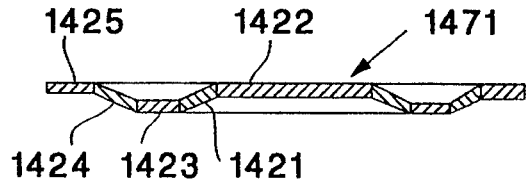
FIG. 11 is a view in cross section taken on the line 11—11 in FIG. 10.

In FIGS. 10 and 11 it will be noted that the central support zone 1422 has at its inner periphery two lugs which are arranged on either side of the longitudinal bent portion 1024. These lugs enable the support surface of the zone 1422 to be increased in association with the lug 1025.

It is thus possible to secure the friction liner 132 adhesively on the said zone 1422.

In all cases the flexible extensions, which are generally in the form of lugs 725-925-1025, in accordance with the invention enable the appropriate friction liner to be secured adhesively.

The said flexible lugs are accordingly coated with adhesive.

We claim:

1. A liner support disc for a clutch friction wheel comprising at least one central portion (16) and a peripheral portion divided into at least one series of radial blades (771-971-1071-1471) of tripod type, in which said blades have, defined by bent portions (721-921-1121-1421), a central support zone (722-922-1022-1422) and two peripheral support zones (723-923-1023-1423) on either side of said central zone, said peripheral zones being offset axially with respect to said central zone, and in which said central support zone is joined to the at least one central portion (16) through a foot which includes an inclined zone in the form of a longitudinal bent portion (724-924-1024) at right angles to the radial axis of symmetry of a said blade, characterized in that the central zone (722-922-1022-1422) of at least some of the tripod blades (771-971-1071-1471) is extended centrally (at 725-925-1025) radially inwardly by virtue of a slot (726-926-1026) formed in the longitudinal bent portion (724-924-1024).

2. A liner support disc according to claim 1, characterized in that said extensions (725-925-1025) are in the form of lugs extending generally radially.

3. A liner support disc according to claim 1, characterized in that the slots (726-926-1026) define said central zone (722-922-1022-1422) locally.

4. A liner support disc according to claim 3, characterized in that the slots (726) are generally V-shaped with a rounded base, with the point of the V being directed towards the axis of the central portion (16).

5. A liner support disc according to claim 3, characterized in that the slots (926-1026) are U-shaped, with the base thereof being directed towards the axis of the central portion (16).

6. A liner support disc according to claim 5, characterized in that the extension (925) is U-shaped, with a root zone of reduced width joining it to said central zone.

7. A liner support disc according to claim 1, characterized in that the radial axis of symmetry of the slots (726-926-1026) is coincident with the radial axis of symmetry of the tripod blades (771-971-1071-1471).

8. A liner support disc according to claim 1, characterized in that the tripod blades (771-1071) are arranged in circumferential alternation with tongues (772-1072) in image of said blades, so that the said tongues have a central zone (823-1023) in the plane of the central portion (16), together with two peripheral support zones (822-1122) on either side of said central zone (823-1023).

9. A liner support disc according to claim 1, characterized in that said tripod blades are arranged in circumferential alternation with tongues (972-973-1472) having, in a bent junction portion (931-941-621), a support zone (932-942-944-1125) which is offset axially towards said central zones of the associated tripod blades (971-1471).

10. A liner support disc according to claim 1, in which said central support zone of the tripod blades (771-1071) has at least one hole (19) for the passage of a fastening member (47) through it, characterized in that said extension (725-925-1025) is provided with an additional hole (19) for the passage of a fastening member through it.

11. A liner support disc according to claim 1, characterized in that said extension (725-925-1025) is coated with adhesive.

\* \* \* \* \*